(12) United States Patent
Oldham

(10) Patent No.: US 7,274,954 B2
(45) Date of Patent: Sep. 25, 2007

(54) COMMUNICATION DEVICE INCLUDING ONE OR MORE ELECTRICAL CONTROL BUTTONS IN AN UPPER HOUSING PART

(75) Inventor: Katherine A. Oldham, Waukegan, IL (US)

(73) Assignee: Motorola, Inc., Schaumburg, IL (US)

( * ) Notice: Subject to any disclaimer, the term of this patent is extended or adjusted under 35 U.S.C. 154(b) by 514 days.

(21) Appl. No.: 10/874,063

(22) Filed: Jun. 21, 2004

(65) Prior Publication Data

US 2005/0282594 A1 Dec. 22, 2005

(51) Int. Cl.
*H04M 1/00* (2006.01)
(52) U.S. Cl. .............................. 455/575.3; 455/575.1; 455/575.4; 379/433.08; 379/433.13; 379/433.06
(58) Field of Classification Search ............... 455/90.3, 455/575.3, 575.1, 575.4; 379/433.02, 433.13, 379/433.06
See application file for complete search history.

(56) References Cited

U.S. PATENT DOCUMENTS

| 4,083,011 A | 4/1978 | Ferrell et al. |
| 6,215,474 B1 | 4/2001 | Shah |
| 6,295,441 B1 * | 9/2001 | Bjorkengren ............ 455/575.3 |
| 6,359,984 B1 * | 3/2002 | Kim ....................... 379/433.02 |
| 6,621,066 B2 * | 9/2003 | Kim ........................... 250/221 |
| 7,039,443 B2 * | 5/2006 | Opela et al. ................ 455/565 |
| 2003/0199290 A1 | 10/2003 | Viertola |

FOREIGN PATENT DOCUMENTS

| EP | 0 720 339 A2 | 7/1996 |
| EP | 0 746 062 A2 | 12/1996 |
| EP | 0 963 090 A2 | 12/1999 |
| EP | 1 392 038 A1 | 2/2004 |
| EP | 1 408 673 A2 | 4/2004 |
| WO | WO 03/096558 A1 | 11/2003 |

* cited by examiner

*Primary Examiner*—Sanh D. Phu
(74) *Attorney, Agent, or Firm*—Lawrence J. Chapa

(57) ABSTRACT

Folding wireless communication devices (100, 700) comprise first parts (102, 1002) that are rotatably coupled to second parts (104, 1104). The first parts (102, 1002) can be moved from first positions in which the first parts (102, 1002) overlie the second parts (104, 1104) to second positions in which the first parts (102, 1002) extend upward away from the second parts (104, 1104). The first parts (102, 1002) comprise one or more buttons (302, 304, 306, 308 1010, 1012), e.g., a pair of directional buttons, such as "UP" and "DOWN" control buttons (302, 304, 1010, 1012). Hardware and/or software is used to change the function of the buttons (302, 304, 306, 308 1010, 1012) depending on the position of the first parts (102, 1002).

6 Claims, 9 Drawing Sheets

COMMUNICATION DEVICE INCLUDING ONE OR MORE ELECTRICAL CONTROL BUTTONS IN AN UPPER HOUSING PART

FIELD OF THE INVENTION

The present invention relates in general to handheld communication devices. More particularly, the present invention relates to handheld communication devices, which have at least a two part housing, where the first housing part is adapted to rotate relative to the second housing part, and where the upper housing part and/or flip including one of the two part housings has one or more electrical control buttons.

BACKGROUND OF THE INVENTION

There is an interest in making certain handheld electronic devices such as cellular telephones smaller. Making such devices smaller makes it more convenient to carry them around at all times.

Concurrently there is a trend toward increasing the functionality of devices. In the case of cellular telephones, increased functionality includes providing operability on multiple frequency bands using multiple protocols and providing the ability to take and playback photographs and/or video clips. Adding more functionality often leads to increased space requirements, which is at odds with the desire to make devices smaller. Thus, the volume available for accommodating components is at a premium.

Also, notwithstanding the desire to increase the functionality of devices, such as cellular telephones, there is a continuing desire to make operation as intuitive as possible for users. Reducing, the size of devices increases the challenge posed by human-machine interface (e.g., ergonomic, and User Interface (UI)) issues especially in the case of devices capable of performing multiple functions using a finite number of user input detection elements, which dependent upon the current operating state can each be selectively associated with one of a plurality of different functions.

In the case of wireless communication devices, such as cellular telephones, reducing their size, also increases the potential that, in use, their antennas will be largely cover by a user's hand and signals coming to, or transmitted from the antenna will be partially absorbed leading to reduced Quality of Service (QoS).

Thus, there is a desire to make devices, such as cellular telephones, having a reduced size, which can accommodate increased functionality, more intuitive human-machine interface characteristics, and a sufficient level of Quality of Service.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one, or more than one. The term plurality, as used herein, is defined as two, or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
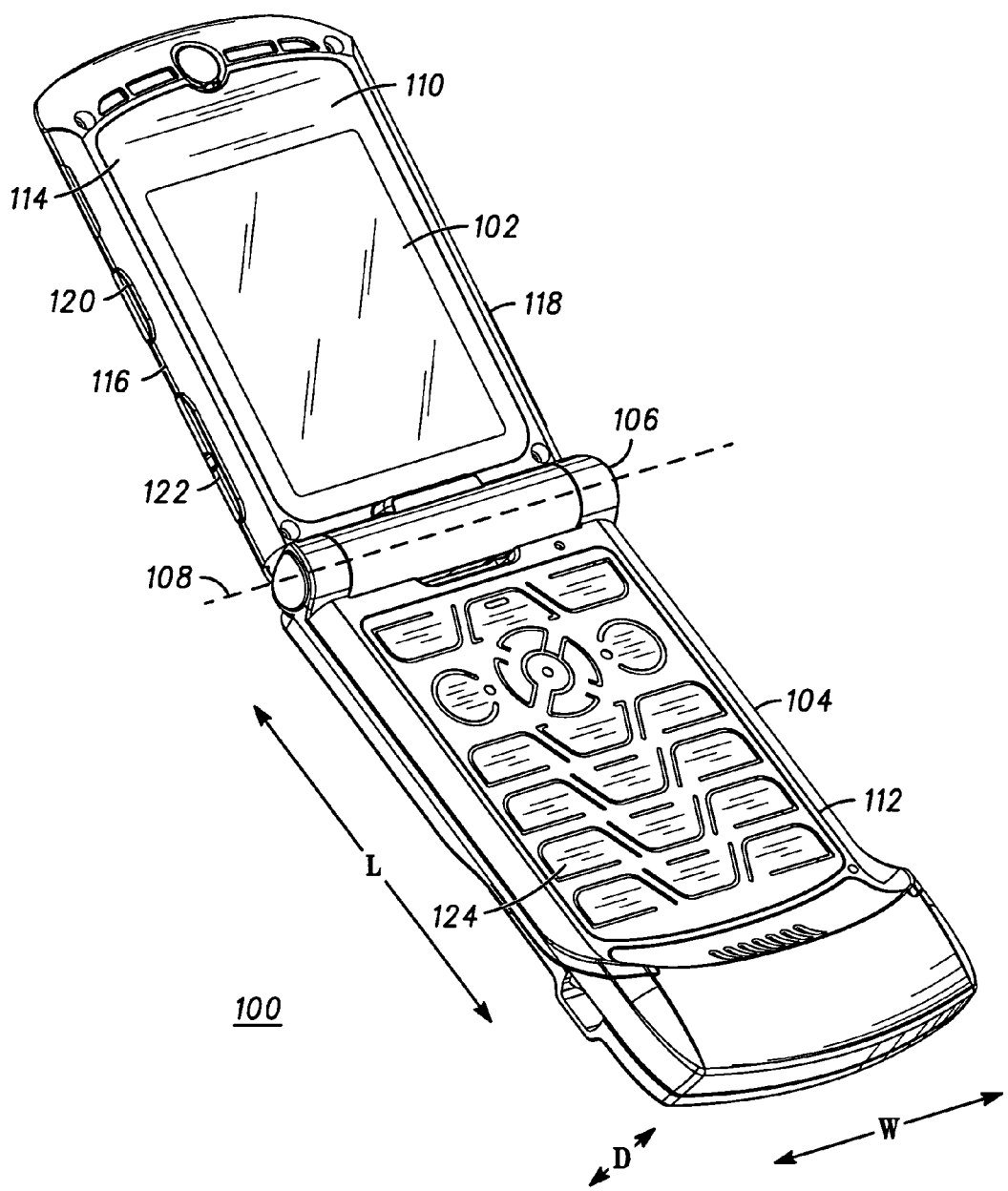
FIG. 1 is a first perspective view of a first handheld communication device, in a first configuration, for example an opened position.
Figure 2:
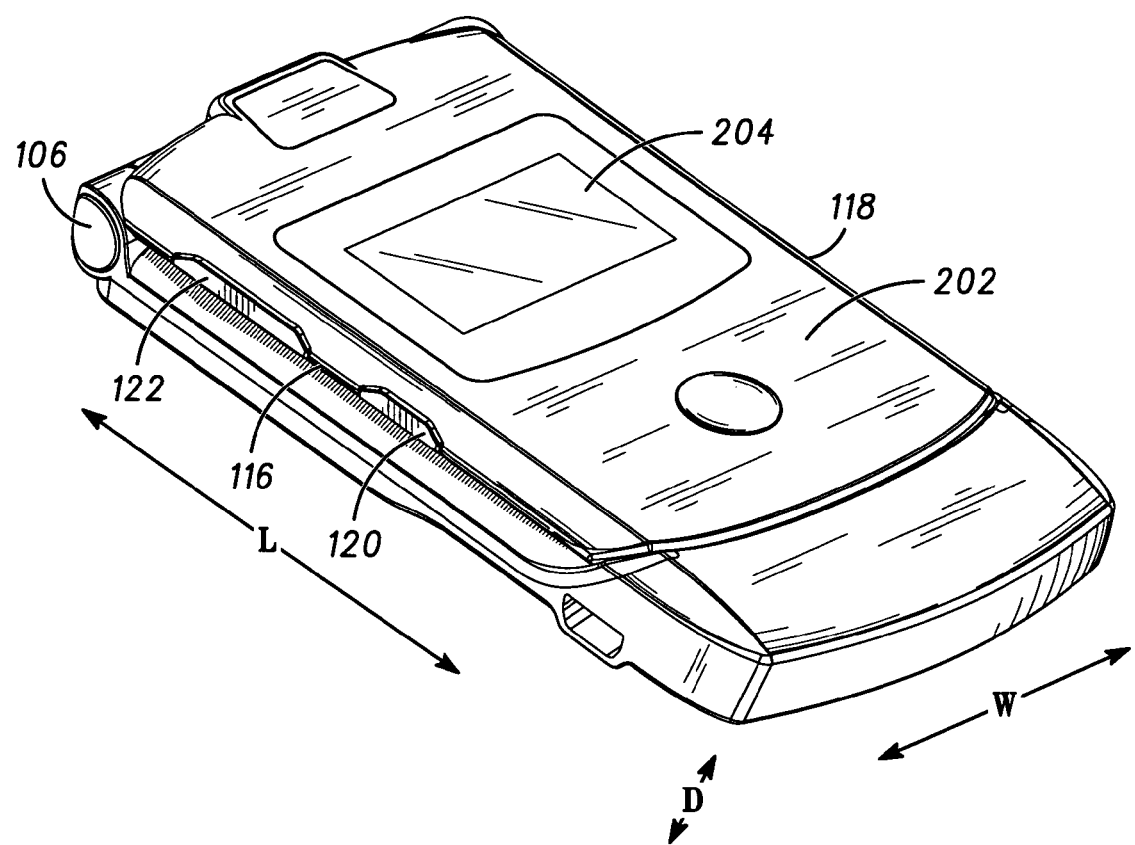
FIG. 2 is a second perspective view of the first handheld communication device, shown in a second configuration, for example a closed position.

FIG. 1 is a first perspective view of a first handheld communication device, in particular a clamshell wireless communication device 100, shown in a first configuration and FIG. 2 is a second perspective view of the first handheld communication device 100, shown in a second configuration. The device 100 comprises an upper part also know as a flip 102, and a lower part 104. The flip 102 and the lower part 104 are coupled by a rotational coupling, in particular a hinge 106. The device 100 is relatively flat, which is to say that its depth D dimension is smaller than its width W and length L dimensions. An axis 108 of the hinge 106 is aligned with the width dimension of the device 100. The flip 102 comprise a first inside surface 110, and a first outside surface 202. The lower part 104 comprises a second inside surface 112, and a second outside surface, which is not shown in FIGS. 1 and 2, wherein the second outside surface is facing away from the viewer. The hinge 106 allows the flip 102 to be rotated from the first configuration in which the flip 102 extends upward away from the lower part 104, i.e. opened position, to the second configuration in which the flip 102 overlies the lower part 104, i.e. closed position.

A main display 114 of the device 100 is located at the inside surface 110 of the flip 102. An auxiliary display 204 is located at the outside surface 202 of the flip 102. The main display 114 and the auxiliary display 204 are useful for displaying control, screens including menus and information related to communications including lists of received calls, lists of placed calls, telephone numbers in a phone book, email addresses and web addresses, as well as a list of selectable functions, among other things.

Figure 3:
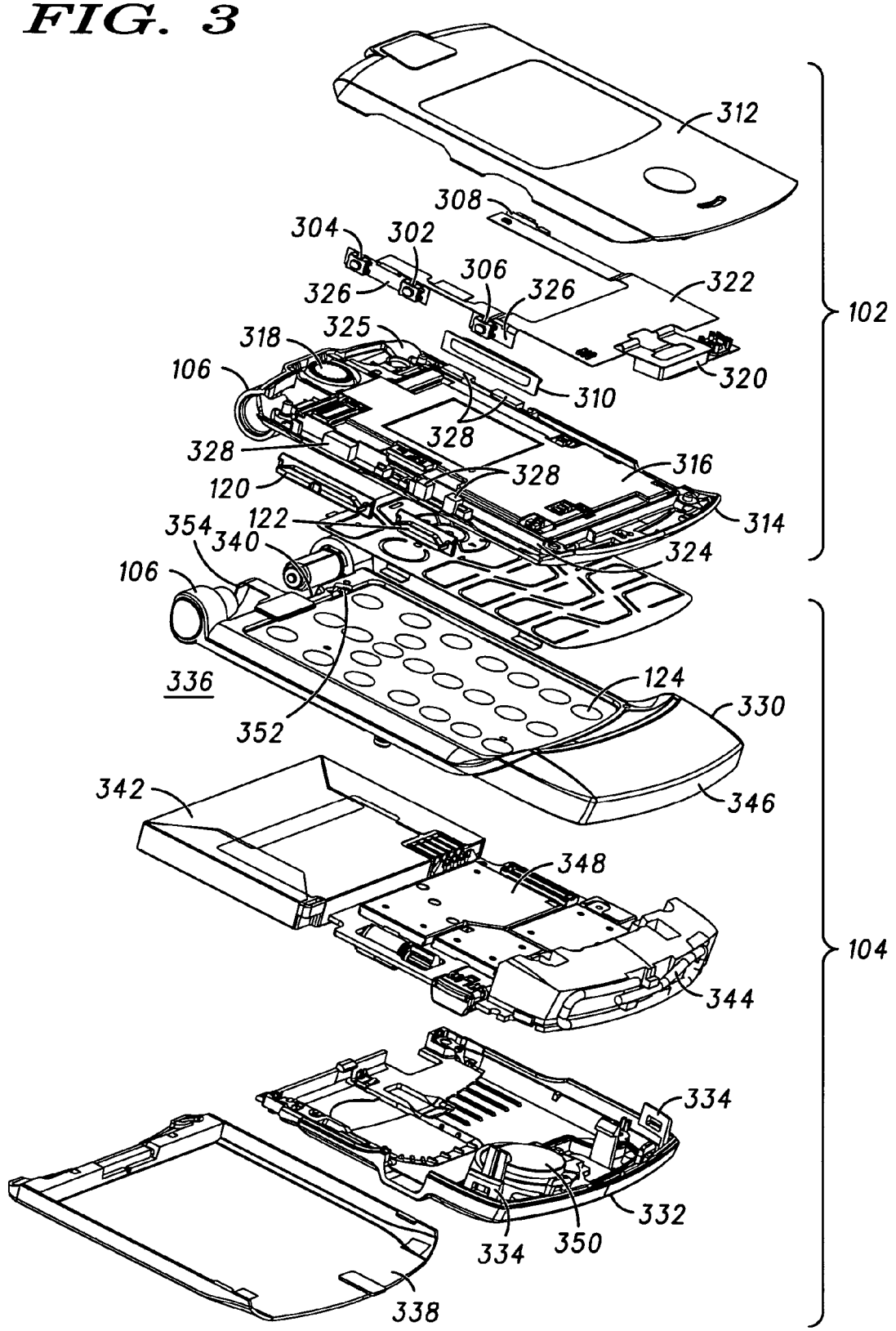
FIG. 3 is an exploded view of the handheld communication device shown in FIGS. 1-2.

The flip 102 comprises a plurality of buttons including a first button 302 (FIG. 3), a second button 304 (FIG. 3), a third button 306 (FIG. 3), and a fourth button 308 (FIG. 3). These buttons 302-308 are not directly visible in FIGS. 1-2. The first through third buttons 302-306 are located proximate a first side edge 116 of the flip 102. The fourth button 308 is located proximate a second side edge 118 of the flip 102. The four buttons 302-308 are covered by three button covers including a first button cover 120, a second button cover 122 and a third button cover 310. The first button 302 and the second button 304 share the first button cover 120, the third button 306 is covered by the second button cover 122, and the fourth button 308 is covered by the third button cover 310. The four buttons 302-308 are used to generate signals for controlling various aspects of the operation of the device 100. In one or more modes of operation of the device 100 the first button 302 and the second button 304 are used as directional to inputs, such as "UP" and "DOWN" commands to control software of the device 100. A keypad 124 is located on the inside surface of the lower part 112.

Referring now to FIG. 3 an exploded view of the handheld communication device 100 is shown. As shown in FIG. 3, the flip 102 comprises a flip outer housing part 312 and a flip inner housing part 314 which are coupled together by screws (not shown), or coupled together using one or more other well known elements and/or methods. A number of components are located in the flip 102 between the flip outer housing part 312 and the flip inner housing part 314. These components include a display module 316 that includes the main display 114, and the auxiliary display 204, an earpiece speaker 320, a flexible circuit 322, and a magnet 325. A camera 318 is incorporated as part of the handheld communication device 100 in the space occupied by the hinge 106. When the device 100 is assembled, the flexible circuit 322 is positioned on the display module 316. The flip inner housing part 314 includes an integrally molded rectangular frame 324 that is sized to receive at least a portion of the display module 316, which generally fits within the frame 324. The flexible circuit 322 includes three peripheral tab portions 326 that are folded over the frame 324. The buttons 302-308 are mounted on the peripheral tab portions 326 positioned along the side of the display module 316. A plurality of resilient foam blocks 328 are positioned between the button covers 120, 122, 310 and the frame 324. The resilient foam blocks 328 serve to enhance the tactile feel of the buttons 302-308. The magnet 325 is mounted in the flip inner housing part 314 near the hinge 106, which interacts with a Hall effect sensor, associated with the lower part 104 of the two part housing, as discussed below.

As shown in FIG. 3, the lower part 104 of the device 100 comprises a lower part inner housing part 330 and a lower part outer housing part 332 which are coupled together by screws (not shown) and a pair of resilient catches 334 that are integrally molded with the lower part outer housing part 332. Similar to the upper part, one skilled in the art will recognize other elements and/or methods could be used to hold the lower part inner housing part 330 to the lower part outer housing part 332. A battery compartment 336 is defined between the lower part inner housing part 330, and a battery compartment cover 338 that is located adjacent the lower outer housing part 332. The battery compartment 336 is located proximate a top end 340 of the lower part 104. A battery 342 is substantially disposed in the battery compartment 336. An antenna 344 is located proximate a bottom end 346 of the lower part 104. A populated printed circuit board 348 that includes communication and control circuits of the device 100 is located between the bottom end 346 and the battery compartment 336. Note that the battery 342 and the populated printed circuit board 348 are located in a common plane in a lengthwise L direction, and do not overlap in the direction of of depth D. The latter arrangement allows the thickness of the lower part 104 to be greatly reduced, which reduces the thickness of the entire device 100, making the device 100 more convenient to carry. Note however that this arrangement also limits the longitudinal size of the battery. In the interest of extending battery capacity and thereby the duration of standby time and the amount of communication that can be conducted with the device 100 before battery recharging is necessary, the width of the battery 342 is increased. Placement of the four buttons 302-308 in the flip 102, as opposed to near the top end 340 of the lower part 104 where they would be positioned according to conventional practice, avoids adding to the width of the device 100, which in the illustrated embodiment corresponds to the width of the battery 342, thereby allowing the device 100 to be smaller and making the device 100 more convenient to carry. Positioning the buttons 302-308 in the flip 102 also leads to users tending to position their hands closer to the flip 102 and or the upper part in order to more easily actuate the buttons 302-308. In this position a user's hand will be positioned away from the antenna 344 located near the bottom end 346 of the lower part 104, and will absorb less energy from signals emanating from, or being received by the antenna 344 thereby leading to improved Quality of Service (QoS). Also, as shown in FIG. 3, the keypad 124 comprises a cover 349 made of a sheet of flexible material. A microphone 350 is mounted on the populated printed circuit board 348 near the bottom end 346 of the lower part 104.

A portion of the lower part inner housing part 330 is shown cutaway to show a Hall effect sensor 352 that is located in lower part 104. The Hall effect sensor 352 works in conjunction with the magnet 325 to sense whether the flip 102 is positioned overlying the lower part 104, such as a proximately closed position, as shown in FIG. 2, or extended away from the lower part 104, such as in an opened position, as shown in FIG. 1. A flexible circuit feedthrough 354 connects circuits in the lower part 104 to circuits in the flip 102. In the assembled device 100 the flexible circuit feedthrough 354 passes through the hinge 106.

Figure 4:
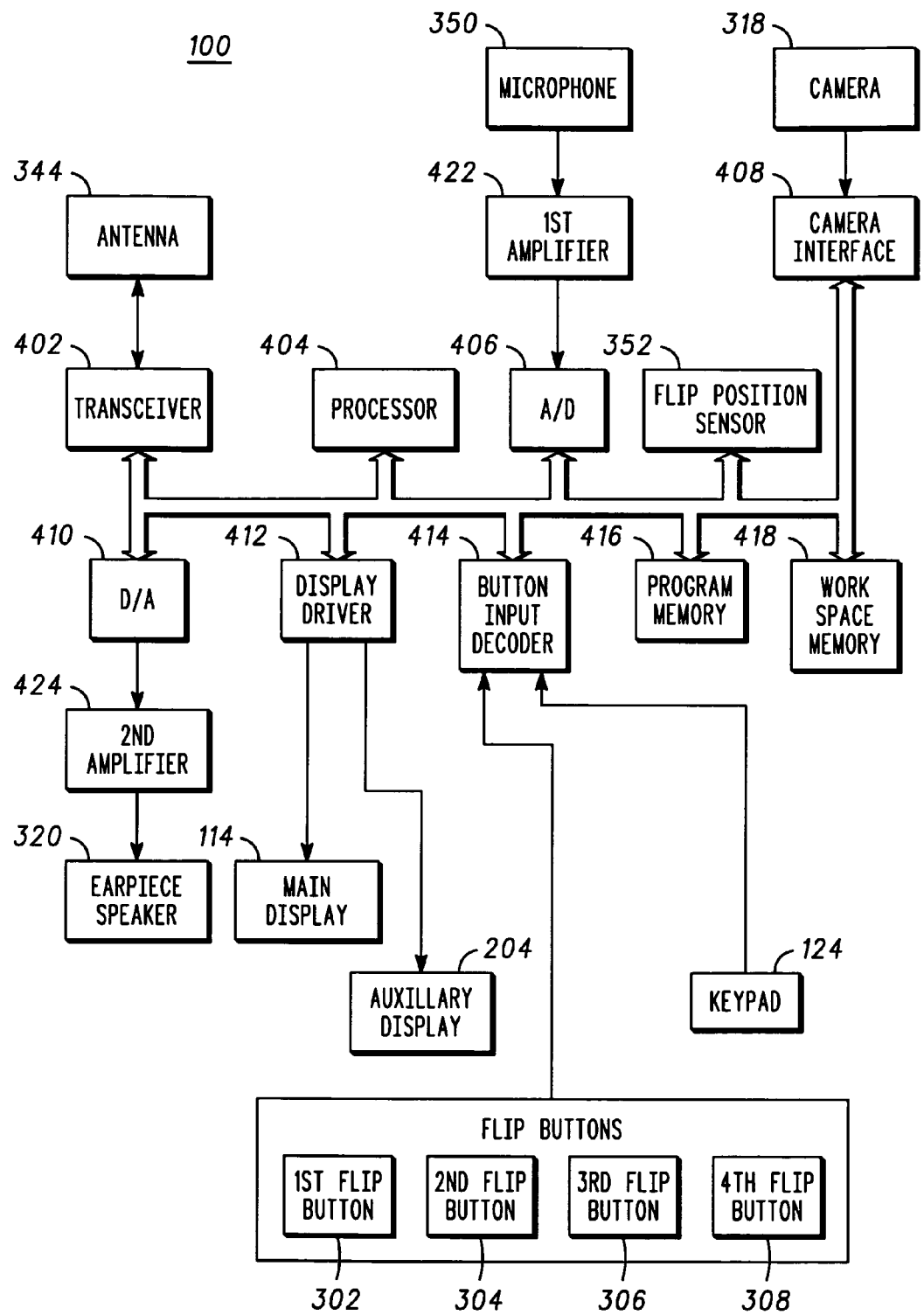
FIG. 4 is a block diagram of the handheld communication device shown in FIGS. 1-3.

FIG. 4 is a block diagram of the handheld communication device 100 shown in FIGS. 1-3. As shown in FIG. 4 the device 100 comprises a transceiver 402, a processor 404, an analog-to-digital converter (A/D) 406, the flip position sensor 352, a camera interface 408, a digital-to-analog converter (D/A) 410, a display driver 412, a button interface decoder 414, a program memory 416, and a workspace memory 418 coupled together through a system bus 420.

The transceiver 402 is coupled to the antenna 344. Radio Frequency and/or microwave signals that are modulated with encoded data (e.g., digitized voice audio, text messages, photos, etc.) pass between the transceiver 402 and the antenna 344.

The processor 404 executes control programs, and may also perform communication encoding and decoding tasks.

Programs executed by the processor 404 are stored in the program memory 416. The processor 404 uses the workspace memory 418 in executing programs. The processor 404 is suitably part of a highly integrated micro-controller integrated circuit. The micro-controller suitably includes one or more of the other above mentioned components that are coupled together through the signal bus 420. The transceiver 402, the processor 404, and optionally other blocks shown in FIG. 4 are embodied in circuits of the populated printed circuit board 348.

The microphone 350 is coupled through a first amplifier 422 to the A/D 406. The A/D 406 is used to digitize a user's spoken words, which are then encoded by a voice encoder (vocoder) component of the processor.

The camera 318 is interfaced to the processor 404 through the camera interface 408. The camera interface 408 reads and digitizes pixel data from the camera 318, and makes such data available to the processor 404 for further processing, e.g., image/video compression encoding.

The button input decoder 414 is coupled to the first through forth buttons 302-308 located in the flip 102 and to each key of the keypad 124. The button input decoder 414 receives the electrically encoded actuation signals from the keypad 124 and the buttons 302-308 and identifies each depressed key or button 302-308 to the processor 404. By positioning the buttons 302-308 in an opposite housing part, in this case the flip 102, relative to the housing portion including the button input decoder, which is generally included on a printed circuit board included in the lower housing part 104, the electrically encoded actuation signals, in addition to the signals traveling between the processor and the displays 114, 204, in at least the illustrated embodiment are routed through the hinge 106.

The display driver 412 drives the main display 114 and the auxiliary display 204. The D/A 410 drives the earpiece speaker 320 through a second amplifier 424.

Figure 5:
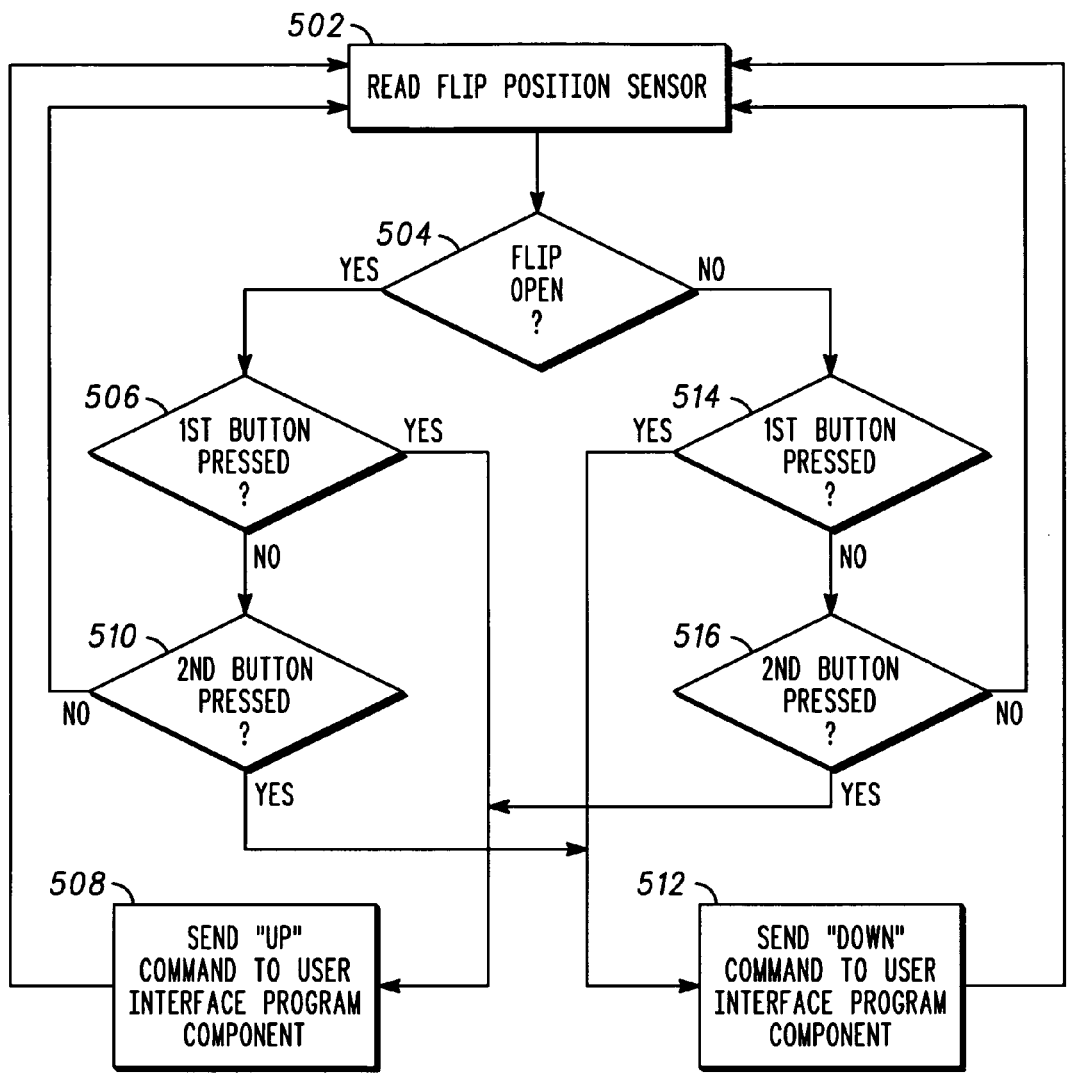
FIG. 5 is a first flowchart showing a first aspect of the operation of the handheld communication device shown in FIGS. 1-4.
Figure 6:
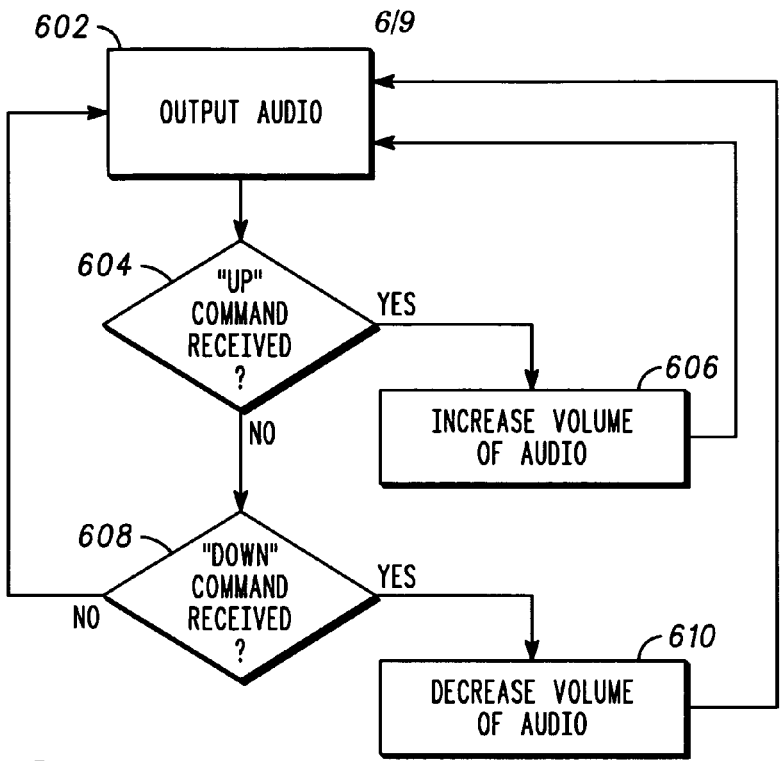
FIG. 6 is a second flowchart showing a second aspect of the operation of the handheld communication device shown in FIGS. 1-4.
Figure 7:
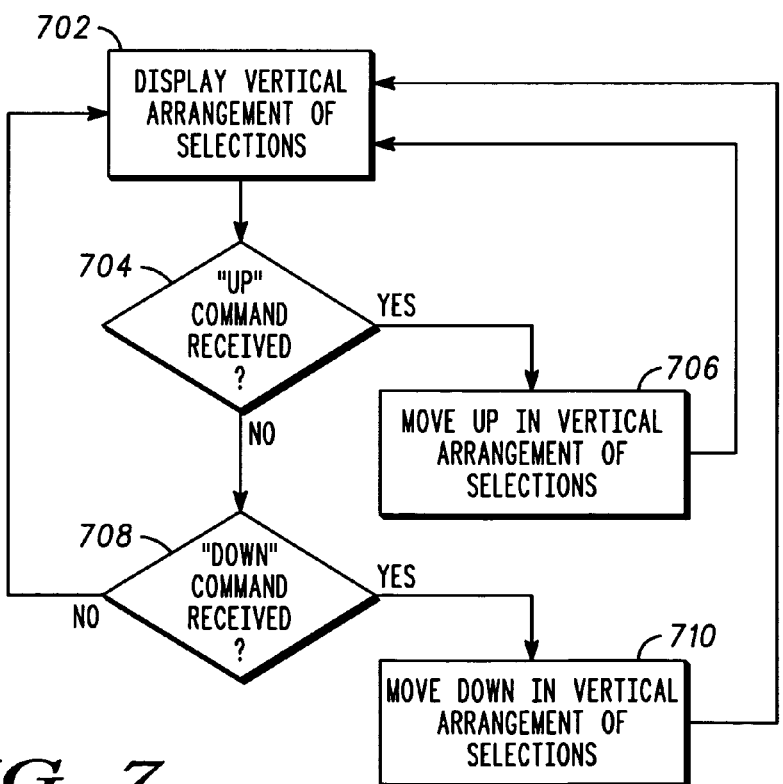
FIG. 7 is a third flowchart showing a third aspect of the operation of the handheld communication device shown in FIGS. 1-4.

FIGS. 5-7 are flowcharts illustrating aspects of the operation of the device 100. Software that operates according to the flowcharts is suitably stored in the program memory 416 and executed by the processor 404.

FIG. 5 is a first flowchart showing a first aspect of the operation of the handheld communication device shown in FIGS. 1-4. In block 502 the flip position sensor 352 is read to determine whether the flip 102 is in the substantially opened position shown in FIG. 1 or the substantially closed position, shown in FIG. 2. Block 504 is a decision block, the outcome of which depends on whether the flip 102 is substantially open, i.e., in the position shown in FIG. 1 extending away from the lower part 104. If so, then the first flowchart continues with decision block 506 the outcome depends on whether the first button 302 has been pressed. If it is determined in block 506 that the first button 302 has been pressed then the first flowchart continues with block 508 in which a direction consistent with an "UP" command is sent to a user interface program that accepts input from the first and second buttons 302, 304. After block 508 the first flowchart loops back to block 502. If on the other hand it is determined in block 506 that the first button 302 has not been pressed, then the first flowchart continues with decision block 510. The outcome of decision block 510 depends on whether the second button 304 has been pressed. If it is determined in decision block 510 that the second button 304 has been pressed then the first flowchart branches to block 512 in which a direction consistent with a "DOWN" command is sent to the aforementioned user interface program. After block 512 the first flowchart loops back to block 502. If it is determined in decision block 510 that the second button 304 has not been pressed then the first flowchart similarly loops back to block 502.

If in block 504 it is determined that the flip 102 is not open then the first flowchart branches to decision block 514. The outcome of decision block 514 depends on whether the first button 302 has been pressed. If it is determined, in decision block 514 that the first button 302 has been pressed then the first flowchart branches to block 512 described above. If on the other hand, it is determined in decision block 514 that the first button 302 has not been pressed then the first flowchart branches to decision block 516. The outcome of decision block 516 depends on whether the second button 304 has been pressed. If it is determined in decision block 516 that the second button 306 has been pressed then the first flowchart branches to block 508 previously described.

Note that FIG. 5 is a representation of a process that is suitably implemented in hardware or software or a combination of software and hardware. For example, one possible hardware solution could include a two-input exclusive-or gate having one of its inputs coupled to the Hall effect sensor 352 for alternatively presenting a corresponding logic level associated with each of the states of the rotationally coupled housing elements, corresponding to an opened and a closed position. The change of state in the rotational state of the housing will reverse the polarity of the electrically encoded actuation signal. Furthermore, the sequence of operations can vary from what is shown without departing from the spirit of what is conveyed. The implementation will vary depending on the extent to which it relies on hardware, and the programming language used and software environment in which it is implemented. Still further, for example, the state of the flip position sensor 352 may only be read in response to a processor interrupt that is triggered by a button actuation. Other hardware/software variations are further possible without departing from the teachings of the present invention.

Software and/or hardware embodying the flowchart shown in FIG. 5 allows the first and second buttons 302, 304 which in certain modes of operation of the device 100 are used as a pair to enter "UP" and "DOWN" commands to be used more intuitively. Even though, the particular one of the first button 302 and second button 304, which is on top, changes depending on whether the flip 102 is in a opened position or a closed position, using software and/or hardware embodying the flowchart shown in FIG. 5 allows whichever button is on top to be used to enter "UP" commands and whichever button is below to be used to enter "DOWN" commands regardless of whether the flip 102 is open or closed. Thus, buttons can be located in the flip 102 thereby securing the performance attributes previously described without compromising the ease of use of the device 100.

FIG. 6 is a second flowchart showing a second aspect of the operation of the handheld communication device shown in FIGS. 1-4. FIG. 6 describes a user interface program or hardware/software combination that allows a user to adjust the volume of audio output by the device 100 using the first and second buttons 302, 304. A program and/or hardware embodying the second flowchart is active in states of operation of the device 100 in which audio is being output. Audio is output by an audio output system that comprises the D/A 410, the amplifier 424 and the earpiece speaker 320 and may comprise a specialized audio source (not shown). Alternatively, a loudspeaker is used to output audio. Block 602 represent the outputting of audio e.g. through the earpiece speaker 320. Audio is suitably output under the control of the processor 404. Block 604 is a decision block, the outcome of which depends on whether an "UP" command is received. If an "UP" command is received then the second flowchart branches to block 606 in which the volume of audio being output by the device 100 is increased, and thereafter the flowchart returns to block 602 to continue to output audio at increased volume. If it is determined in decision block 604 that an "UP" command has not been received then the second flowchart continues with decision block 608, the outcome of which depends on whether a "DOWN" command has been received. If it is determined in decision block 608 that a "DOWN" command has been received, then the second flowchart branches to block 610 in which the volume of audio being output is decreased, and thereafter loops back to block 602 to continue to output audio albeit at reduced volume. If, on the other hand, it is determined in block 608 that a "DOWN" command has not been entered, then the second flowchart returns to block 602 and no change based upon user control is made to the volume level. The second flowchart can be implemented in software and/or hardware.

Figure 8:
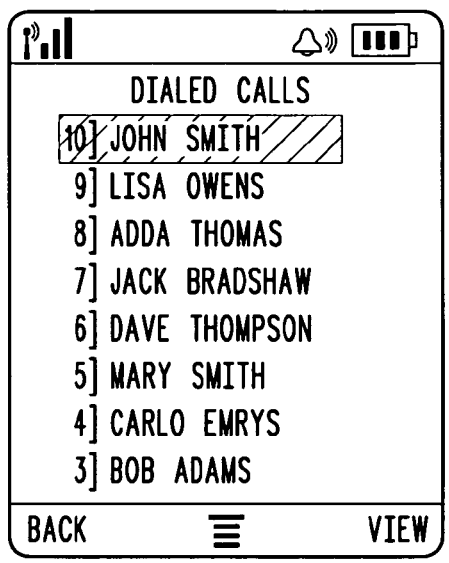
FIG. 8 is a first screenshot of a display of the handheld communication device shown in FIGS. 1-4, showing a first vertical arrangement of selections.
Figure 9:
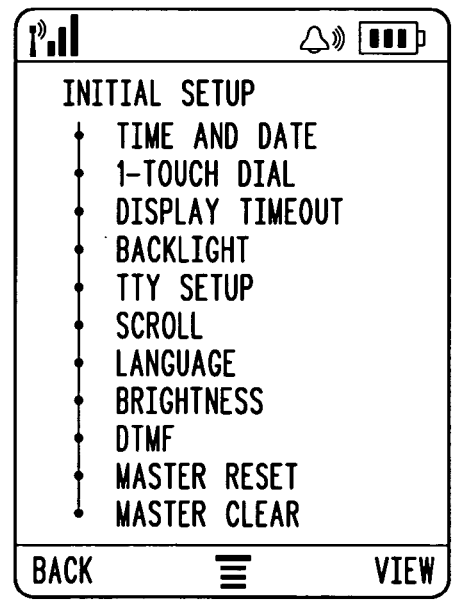
FIG. 9 is a second screenshot of a display of the handheld communication device shown in FIGS. 1-4, showing a second vertical arrangement of selections.

FIG. 7 is a third flowchart showing a third aspect of the operation of the handheld communication device shown in FIGS. 1-4. FIG. 7 describes a user interface program or hardware/software combination that allows a user to navigate in a vertical arrangement of selections. The vertical arrangement of selections can be a list such as a list of names of people whose phone numbers were recently dialed as shown in FIG. 8, or a list of control menu options as shown in FIG. 9. The vertical arrangement of selections can be displayed on the main display 114 or the auxiliary display 204. Referring to FIG. 7 in block 702 a vertical arrangement of selections is displayed on one of the displays 114, 204. Proceeding from block 702, block 704 is a decision block, the outcome of which depends on whether an "UP" command is received. If it is determined in block 704 that an "UP" command has been received then the third flowchart branches to block 706 in which a move up in the vertical arrangement of selections is performed. The move up can entail shifting highlighting up by one place in the vertical arrangement of selections, and/or adding a new selection at the top of the display, and/or removing a selection from the bottom of the display, and shifting other selections down one place. After block 706 the third flowchart loops back to block 702 to continue to display the vertical arrangement of selections.

If on the other hand it is determined in block 704 that an "UP" command has not been entered, then the third flowchart branches to decision block 708. The outcome of decision block 708 depends on whether a "DOWN" command has been received. If a "DOWN" command has been received then the third flowchart branches to block 710 in which a move down in the vertical arrangement of selections is performed. A move down in the vertical arrangement of selections is the reverse of the move up described above. After block 710, the third flowchart loops back to block 702 to continue to display the vertical arrangement of selections.

Note that FIGS. 6, 7 are abstractions of processes that may be implemented in combination with other software operations that are beyond the focus of the present description.

Figure 10:
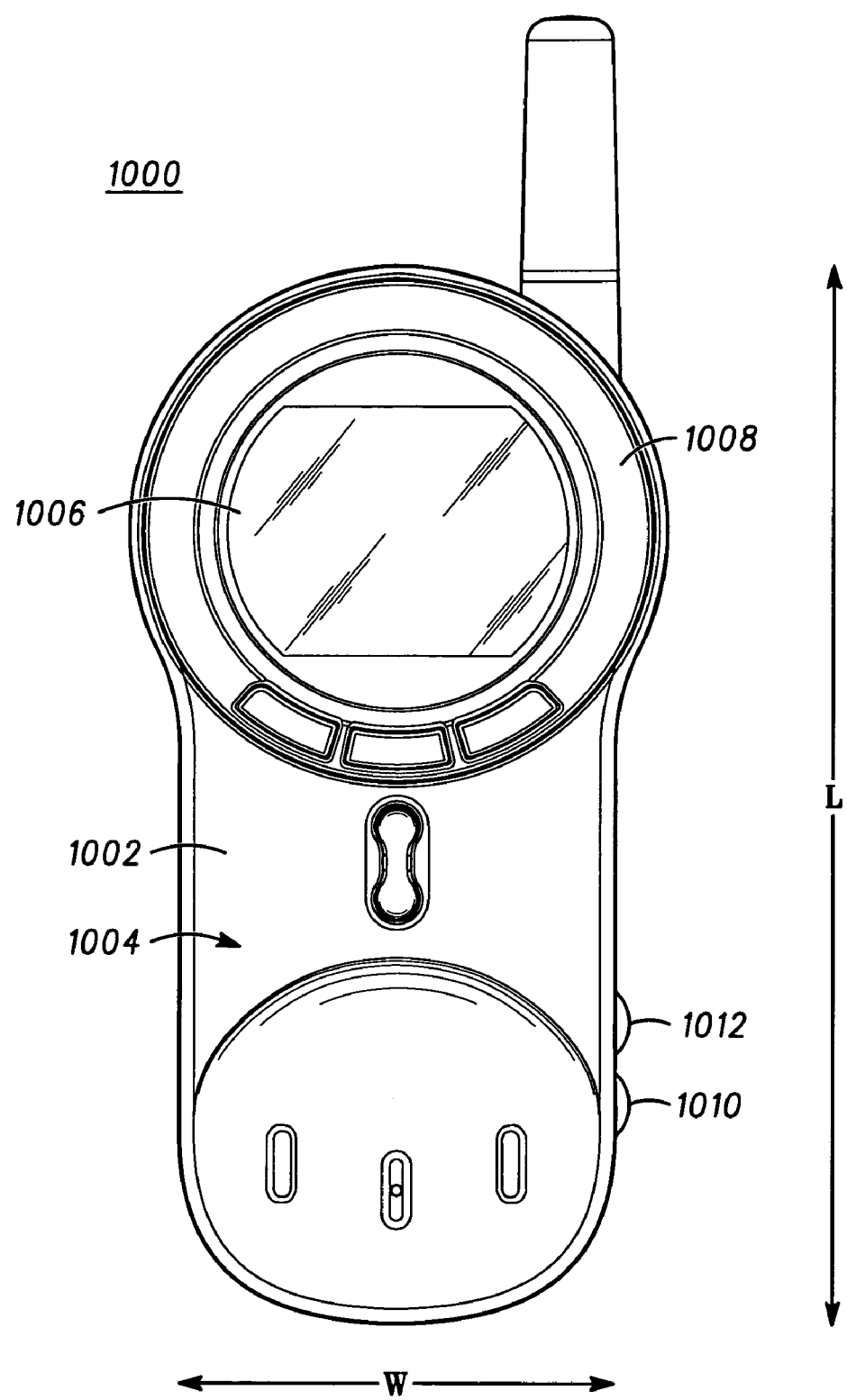
FIG. 10 is a front view of a second handheld communication device, shown in a first configuration, for example a closed position.
Figure 11:
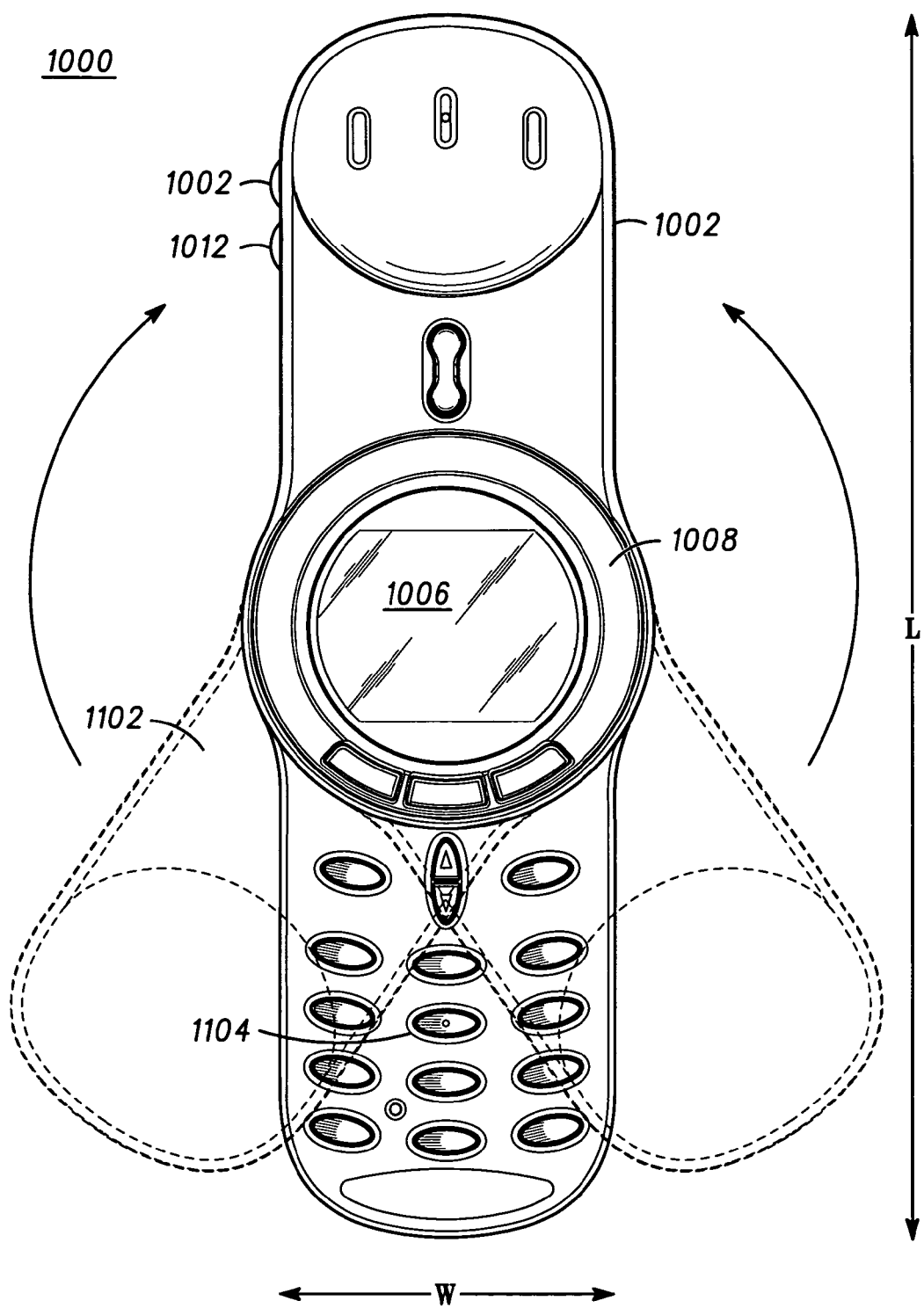
FIG. 11 is a front view of the second handheld communication device, shown in a second configuration, for example an opened position, with other configurations corresponding to a couple of intermediate positions, shown in dashed lines.

FIG. 10 is a front view of a second handheld communication device 1000, shown in a first configuration and/or a substantially closed position, and FIG. 11 is a front view of the second handheld communication device 1000, shown in a second configuration and/or a substantially opened position, with intermediate configurations shown in dashed lines. The second handheld communication device 1000 comprises a first part 1002, and a second part 1102 that is rotationally coupled to the first part 1002. In contrast to the first handheld communication device 100 shown in FIGS. 1-3, for the second device 1000, an axis of rotation of the first part 1002 relative to the second part 1102 is parallel to the thickness and/or depth D of the device 1000 i.e. perpendicular to a front face 1004 of the device 1000. In the perspective of FIGS. 10-11 the axis of rotation of the first part 1002 relative to the second part 1102 is perpendicular to the plane of the drawing sheet. The second part 1102 comprises a keypad 1104 and a display 1006. The first part 1002 rotates about a round bezel 1008 of the display 1006. The first part 1002 comprises a first side mounted button 1010 and a second side mounted button 1012 that is located vertically adjacent the first side mounted button 1010. Rotating the first part 1002 from the configuration shown in FIG. 10 to that shown in FIG. 11 reverses the relative vertical positioning of the two side mounted buttons 1010, 1012, which convey a change of state electrically. The hardware and software described above with reference to FIGS. 4-9 is applicable to the second handheld communication device 1000 with the exception that in at least some embodiments the second device 1000 does not include an auxiliary display, only includes two buttons on the flip (although optionally more are provided), and need not include certain hardware elements shown in FIG. 4 that are outside the focus of the present specification, such as for example the camera interface 408, and camera 318. In the illustrated embodiment, the display is included in the second part 1102, and does not rotate with the first part 1002, such that the same would rotate as the two part housing moves between a closed position and an opened position. Alternatively, the display could be included in the first part 1002.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A handheld communication device comprising:
   a lower part;
   a hinge coupled to said lower part;
   a flip coupled to said lower part by said hinge, wherein said flip can be rotated about said hinge from a first position in which said flip overlies said lower part to a second position in which said flip extends upward away from said lower part, said flip comprising one or more buttons;
   a sensor adapted to detect whether said flip is in said first position;
   a controller electrically coupled to said one or more buttons, and to said sensor;
   wherein said controller is configured to read an output of said sensor, and process input from said one or more buttons in a manner that depends on the output of said sensor; and
   wherein said one or more buttons comprise a pair of buttons including a first button, and a second button that is located above said first button when said handheld communication device is held upright, and said flip is in said first position; and
   said controller is configured to interpret a first actuation signal from said first button as a "DOWN" command, and a second actuation signal from said second button as an "UP" command, when said output of said sensor indicates that said flip is in said first position; and said controller is configured to interpret said first actuation signal from said first button as the "UP" command, and said second actuation signal from said second button as the "DOWN" command, when said output of said sensor indicates that said flip is not in said first position.

2. The handheld communication device according to claim 1 further comprising:

an audio output system coupled to said controller, wherein said audio output system is responsive to said controller to adjust a volume of audio output by said audio output system; and when said controller is in one or more states of operation, said controller is configured to interpret said "UP" command and said "DOWN" command as audio volume control commands, and adjust the volume of audio output by said audio output system up and down in response to said "UP" command and "DOWN" command respectively, whereby, with said handheld communication device held upright regardless of whether the flip is in the first position or the second position, whichever of the first and second buttons is on top will serve to increase volume, and whichever of the first and second buttons is on bottom will serve to decrease volume.

3. The handheld communication device according to claim 1 further comprising:

a first display on a first surface of said flip that faces said lower part when said flip is in said first position; and wherein said controller is configured to display a first vertical arrangement of selections on said first display, when said flip is in said second position; and when said first vertical arrangement of selections is displayed on said first display, said controller is configured to interpret said "UP" command and said "DOWN" command as vertical navigation commands for controlling position in said first vertical arrangement of selections.

4. The handheld communication device according to claim 3 wherein:

said first vertical arrangement of selections comprises a control menu.

5. The handheld communication device according to claim 3 wherein:

said first vertical arrangement comprises a list.

6. The handheld communication device according to claim 3 further comprising:

a second display located on a second surface of said flip opposite said first surface;

wherein said controller is configured to display a second vertical arrangement of selections on said second display; and when said second vertical arrangement of selections is displayed on said second display, said controller is configured to interpret said "UP" command and said "DOWN" command as vertical navigation commands for controlling position in said second vertical arrangement of selections.

* * * * *